No. 791,955. PATENTED JUNE 6, 1905.
T. G. THOMPSON.
WEEDER.
APPLICATION FILED JAN. 12, 1905.
2 SHEETS—SHEET 1.
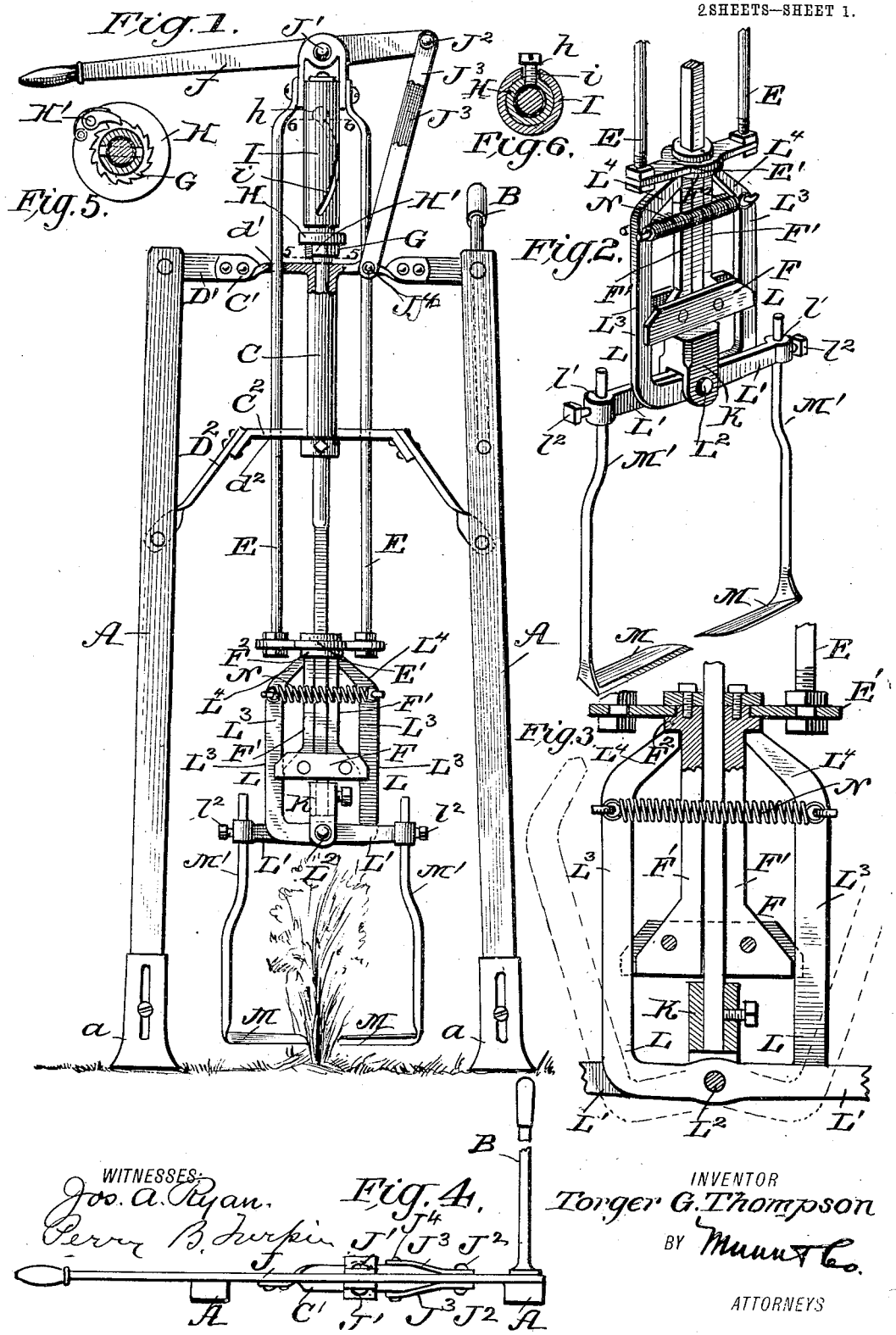
WITNESSES:
Jos. A. Ryan.
Perry B. Turpin.
INVENTOR
Torger G. Thompson
BY Munn & Co.
ATTORNEYS No. 791,955. PATENTED JUNE 6, 1905.
T. G. THOMPSON.
WEEDER.
APPLICATION FILED JAN. 12, 1905.
2 SHEETS—SHEET 2.
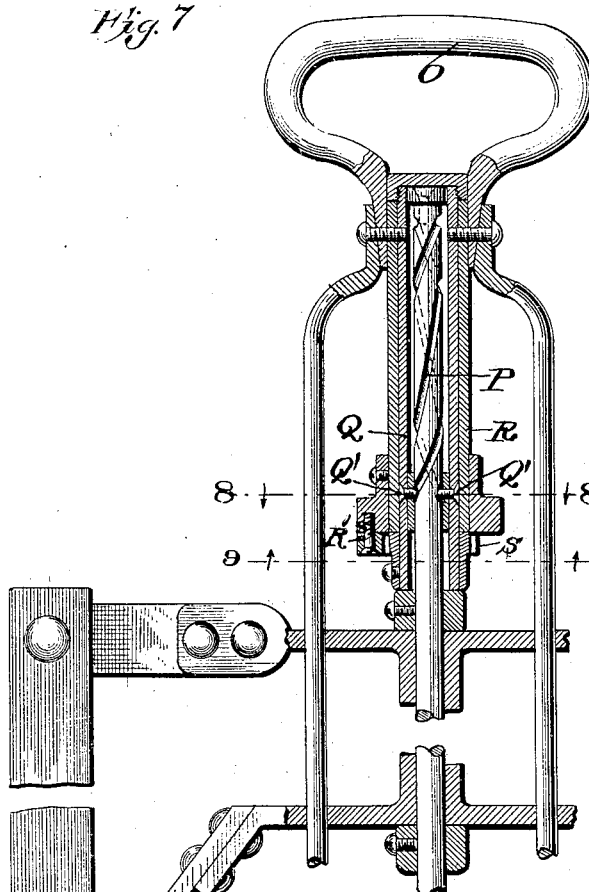
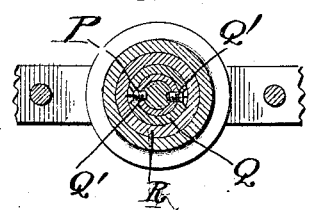
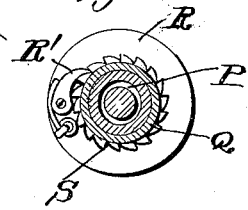
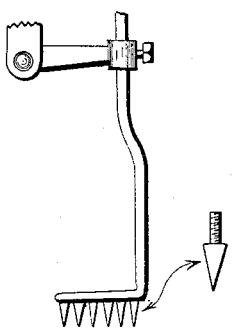
WITNESSES:
Jos. A. Ryan.
Perry B. Turpin.
INVENTOR
Torger G. Thompson.
BY Munn & Co.
ATTORNEYS No. 791,955.					Patented June 6, 1905.

UNITED STATES PATENT OFFICE.

TORGER G. THOMPSON, OF DEERFIELD, WISCONSIN.

WEEDER.

SPECIFICATION forming part of Letters Patent No. 791,955, dated June 6, 1905.

Application filed January 12, 1905. Serial No. 240,782.

*To all whom it may concern:*

Be it known that I, TORGER G. THOMPSON, a citizen of the United States, residing at the town of Deerfield, in the county of Dane and State of Wisconsin, have made certain new and useful Improvements in Weeders, of which the following is a specification.

My invention is an improvement in weeders; and it consists in certain novel constructions and combinations of parts, as will be hereinafter described and claimed.

In the drawings, Figure 1 is a side elevation of an implement embodying my invention. Fig. 2 is a detail perspective view of the weeding-head in connection with the cross-head for spreading the same and the lower end of the main shaft and of the sliding frame. Fig. 3 is a detail sectional elevation showing the construction of the upper end of the weeding-head, the cross-head, the collar at the upper end of the cross-head and the lower portion of the sliding frame. Fig. 4 is a top plan view of the implement. Fig. 5 is a detail cross-section on about line 5 5 of Fig. 1. Fig. 6 is a detail cross-section on about line 6 6 of Fig. 1. Fig. 7 is a sectional elevation of the upper part of the implement, showing a somewhat different construction of cam devices for turning the main shaft. Fig. 8 is a detail cross-section on about line 8 8 of Fig. 7. Fig. 9 is a detail cross-section on about line 9 9 of Fig. 7, and Fig. 10 is a detail view illustrating a somewhat different construction of weeding-cutter from that shown in Figs. 1, 2, and 3 of the drawings.

As shown, the device is adapted for hand use, to be carried in the hand and operated by hand to cut the weeds at or close to the surface of the ground.

The implement comprises a main frame having side legs A spaced apart, which may be provided at their lower ends with feet $a$. One of these legs is provided near its upper end with a laterally-projecting handle B, which may be grasped by one hand of the operator. The feet $a$ may be adjusted up or down and set to any point to where it may be desired to stop the implement in using the same in soft ground. The side legs A are connected by cross devices including a central bearing-tube C, in which the main shaft turns. The central tube has at its upper and lower ends lateral lugs C' and C², to which are bolted bars D' and D², extending to and connected with the opposite side legs A. These cross devices are provided at $d'$ and $d^2$ with guide-openings for the side bars E of the sliding frame, such sliding frame being provided at its upper end with handle devices and supporting at its lower ends a bearing E', in which is journaled the cross-head F, which operates to spread the cutters presently described.

In the construction shown in Fig. 1 the main shaft has above the central tube C a ratchet-wheel G, which is engaged by a pawl H' on the clutch-sleeve H, the latter fitting over the main shaft and arranged to turn freely on the said shaft in the return movement of the clutch-sleeve and being provided with a lateral pin $h$, which operates in a cam-groove $i$ in the cam-sleeve I, this cam-sleeve being held to the slide-frame, and thereby prevented from turning, so that as the cam-sleeve is reciprocated it will operate on its downward movement to turn the clutch-sleeve H, and the latter will correspondingly turn the main shaft and on the return movement of the cam-sleeve the clutch-sleeve will slip back on the main shaft, as will be understood from the drawings. This slide-frame is reciprocated in operation by hand, and the power may be applied directly to the slide-frame by means of a suitable handle connected at the upper end thereof, or where more power is needed it may be preferred to use the lever devices shown and comprising the handle-lever J, connected at J' with the upper end of the handle-bar and pivoted at J² between the upper ends of two links J³, whose lower ends are pivoted at J⁴ to the main frame, as shown in Fig. 1 of the drawings.

It will be noticed that the main shaft is free to turn in the main frame, but is held from longitudinal movement in the said frame, and the sliding frame reciprocates relatively to the main shaft, so that its reciprocating movement may by suitable devices give a revolving movement to the shaft, so that the said shaft will be caused to turn at intervals to revolve the cutters. This reciprocating movement of the slide-frame also operates to spread the cutters on the upward movement of the sliding frame after the weeds have been cut, so that the cutters will be spread before the implement is applied to cut another weed.

The cutting devices are supported at the lower end of the main shaft and comprise the head K, secured by a set-screw on the lower end of the main shaft, the carrier-arms L and the blades carried by the arms L and constructed as I will now describe.

The arms L are L shape, having the lateral bars L' pivoted at L² to the head K, and the upright bars L³ having the inclined portions L⁴ at their upper ends for engagement by the cross-head on the upward stroke of the latter to spread the knives or blades carried by the lateral bars L'. The lateral bars are provided near their outer ends with openings l', in which are adjustably secured by set-screws l² the shanks M' of the blades M, so the blades may be adjusted up or down or turned, as desired, and the shanks M' of the blades may be bent in any suitable manner to secure the desired relation of the blades M. It will be noticed that the blades M are inclined to the surface of the ground and by turning the shanks of the blades forwardly or rearwardly they may be caused to throw the soil toward or away from the plant from around which the weeds have been cut.

The cross-head F is supported by and moved with the slide-frame and operating between the upright bars L³ of the cutting devices tends when raised to its uppermost position to operate upon the inwardly-inclined portions L⁴ of the arms L and spread the blades after the weed has been cut, so the device when applied to another plant will have its cutting-blades spread so they will contract or move inwardly toward each other on the initial downward movement of the sliding frame. To this end the cross-head F is provided with upwardly-projecting bars F', which extend on opposite sides of the lower square portion of the main frame and support at their upper ends a collar F², which journals in the bearing at the lower end of the sliding frame, as shown.

Springs N connect the upper ends of the upright bars L³ and draw the same normally together against the action of the cross-head.

In Fig. 7 I show a somewhat different arrangement of the cam devices for turning the main shaft by the reciprocation of the sliding frame. I also show in Fig. 7 the sliding frame provided at its upper end with a handhold O, so it can be directly operated instead of by the lever, as shown in Fig. 1. This construction shown in Fig. 7 may be employed in light work, where the lever will not be necessary. In Fig. 7 the cam-slot P is shown as formed in the main shaft, and this slot is a compound or double slot entered by pins Q', projecting inwardly from a sleeve Q, encircling the main shaft. The outer sleeve R is connected with the sliding frame and has a pawl R' engaging a ratchet-wheel S, which is secured to the sleeve Q, as shown in Figs. 7 and 9 of the drawings, so that on the upward movement of the sliding frame the sleeve Q may turn backwardly as its pins Q' ride in the cam-slots of the main shaft without turning the said shaft. Manifestly this construction of cam devices for turning the main shaft and of clutch devices for permitting the return movement of their reciprocating devices without turning the main shaft may be employed instead of that shown in Fig. 1 without departing from some of the broad principles of my invention. The construction shown in Fig. 7 enables me to secure a complete revolution of the main shaft at each reciprocation of the sliding frame, while that shown in Fig. 1 only secures a one-half revolution of the main shaft at each reciprocation of the sliding frame, and either construction may be employed wherever desired.

It will be understood that I do not desire to be restricted to any particular form of cutting or weeding device proper, as the form of the blade or cutter may be varied from that shown in Fig. 1, and I may, if desired, use the toothed form of blade or cutter shown, for instance, in Fig. 10, or any other suitable form of digging, cutting, or cultivating device that I may find desirable to apply to the arms of the revolving and spreading head.

It will be understood that in practice the implement may be readily applied over a growing plant and operated to remove weeds around said plant without in any way injuring said plant, and by turning the shanks of the blades in one direction or the other the blades may be set forward or back to either throw the soil toward or away from the growing plant from which the weeds have been removed.

Having thus described my invention, what I claim as new, and desire to secure by Letters Patent, is—

1. An implement substantially as described, comprising the main frame having the side legs, cross connecting devices consisting of a central tube forming a bearing for the main shaft and having the lateral lugs, and the bars connecting the same with the side legs, such cross connecting device being provided with openings forming guides for the sliding frame, the main shaft journaled in the sleeve of the connecting device, and provided with a ratchet-wheel, the clutch-sleeve on the shaft and having a pawl engaging the said ratchet-wheel and provided with the lateral pin, the cam-sleeve having a slot in which said pin operates, handle devices connected with said cam-sleeve, the sliding frame connected with said sleeve and operating in the guide-openings in the connecting devices, the bearing at the lower ends of said sliding frame for the cross-head, the cross-head having the side bars lapping alongside the main shaft, and the collar at the upper ends of said bars and journaled in the lower bearing of the sliding frame, and the weeding devices comprising a head, arms pivoted to the head and having lateral bars and upwardly-extending bars provided with inclined portions for engagement by the cross-head, springs connecting said arms, and the devices carried by said arms, substantially as set forth.

2. The combination with a main frame, of a main shaft therein, weeding devices carried by said shaft and adapted to be spread, the sliding frame, means whereby the sliding of said frame may turn the main shaft, and a cross-head carried by the sliding frame and adapted to spread the weeding devices, substantially as set forth.

3. A weeder substantially as described, comprising the weeding devices, adapted to be spread, a main shaft carrying said weeding devices, means for turning said shaft, and means for spreading the weeding devices.

4. A weeder comprising a weeding-head adapted to be spread, a main frame, means carried by the main frame for turning the weeding-head, and means carried by the frame for spreading the said head, substantially as set forth.

5. The combination of a main shaft, a weeding-head carried thereby, a device reciprocating along the main shaft, and cam devices between said reciprocating device and the main shaft whereby the main shaft may be turned by the reciprocation of said device, substantially as set forth.

6. The combination of a main frame, a main shaft, a frame sliding in the main frame and along the main shaft, a weeding-head on the main shaft and adapted to be spread, cam devices between the sliding frame and the main shaft, whereby to turn the latter, and means carried by the sliding frame for spreading the weeding-head, substantially as set forth.

7. The combination of the main frame the sliding frame, the weeding devices adapted to be spread, a main shaft carrying said weeding devices, means for spreading the weeding devices by the operation of the sliding frame, and cam devices between the sliding frame and the main shaft, substantially as set forth.

8. The combination with the main shaft and the sliding frame having cam devices for turning the shaft by the sliding of said frame, of the weeder-head adapted to be spread, and means for spreading the said head by the operation of the sliding frame.

9. The combination of the main frame having a lateral handle-bar, a sliding frame in the main frame, a main shaft turning in the main frame, means for turning the said shaft, arranged for operation by the sliding frame, and weeding devices carried by the main shaft, substantially as set forth.

10. The combination of the main shaft, the weeding devices carried thereby, a device reciprocating along the main shaft, cam-operating devices for turning the main shaft, and a ratchet and pawl between the reciprocating devices and the device operated thereby, substantially as set forth.

11. The combination of the main shaft, and a weeding-head comprising the arms having the lateral bars and the upright bars, the cross-head reciprocating between the upright bars and adapted to act thereon to spread the weeder, and means for operating the cross-head, substantially as set forth.

12. An implement substantially as described, comprising a main frame having side legs provided at their lower ends with adjustable feet, the cross connecting devices between said legs and having a bearing for the main shaft, and guides for the sliding frame, the main shaft, journaled in its bearings, the sliding frame movable longitudinally in its guides, intermediate devices between the sliding frame and the main shaft, whereby the reciprocation of said frame will operate to turn the main shaft, the spreading head carried by the main shaft, and means connected with the sliding frame for spreading said head.

13. The combination with the spreading head and the shaft carrying the same, of the sliding frame reciprocating along the shaft, and a cross-head arranged to spread the head, and journaled in connection with the sliding frame whereby it may turn with the head and be reciprocated by the movements of the sliding frame, substantially as set forth.

14. The combination of the main frame, having the adjustable feet, the main shaft journaled in said frame, the sliding frame, intermediate devices between the sliding frame and the main shaft, whereby to turn the main shaft by the reciprocation of said frame, the weeding-head adapted to be spread, the cutters carried adjustably by said head, and means arranged for operation by the sliding frame for spreading the said weeding-head, substantially as set forth.

TORGER G. THOMPSON.

Witnesses:
SOLON C. KEMON,
PERRY B. TURPIN.